United States Patent [19]
McCollum et al.

[11] Patent Number: 6,143,215
[45] Date of Patent: *Nov. 7, 2000

[54] METHOD AND APPARATUS FOR MOLDING COMPOSITE ARTICLES

[75] Inventors: Robert P. McCollum; Gene E. Kirila, II, both of Transfer, Pa.

[73] Assignee: VEC Technology, Inc., Greenville, Pa.

[ * ] Notice: This patent is subject to a terminal disclaimer.

[21] Appl. No.: 09/267,189

[22] Filed: Mar. 12, 1999

Related U.S. Application Data

[63] Continuation-in-part of application No. 08/715,533, Sep. 18, 1996, Pat. No. 5,971,742
[60] Provisional application No. 60/078,605, Mar. 19, 1998, and provisional application No. 60/079,441, Mar. 26, 1998.

[51] Int. Cl.⁷ .............................. B29C 45/26; B29C 45/73
[52] U.S. Cl. ................. 264/40.1; 264/40.5; 264/40.6; 264/40.7; 264/316; 264/328.16; 425/143; 425/145; 425/149; 425/150; 425/552; 425/390
[58] Field of Search ..................... 264/40.1, 40.4, 264/40.5, 40.7, 316, 314, 257, 40.6; 425/145, 149, 150, 547, 542, 384, 389, 390, 552, 571, DIG. 44, DIG. 110, 143

[56] References Cited

U.S. PATENT DOCUMENTS

| | | |
|---|---|---|
| 604,258 | 5/1898 | Menier . |
| 2,139,631 | 12/1938 | Dresch et al. . |
| 2,367,779 | 1/1945 | Hull . |
| 2,401,299 | 6/1946 | Glavin . |
| 2,435,866 | 2/1948 | Bilhuber . |
| 2,658,237 | 11/1953 | Cuppett et al. ........................ 264/314 |
| 2,975,476 | 3/1961 | Burke ..................................... 264/314 |
| 3,608,143 | 9/1971 | Schutz . |
| 3,815,863 | 6/1974 | Andeweg ............................... 249/178 |
| 3,840,312 | 10/1974 | Paulson et al. ........................ 425/145 |
| 3,976,415 | 8/1976 | Hauser et al. ......................... 425/145 |
| 4,334,850 | 6/1982 | Garabedian ........................... 425/388 |
| 4,444,832 | 4/1984 | Mazzola et al. ...................... 264/45.3 |
| 4,851,167 | 7/1989 | Marc ..................................... 264/313 |
| 4,873,044 | 10/1989 | Epel ....................................... 264/313 |
| 5,152,949 | 10/1992 | Leoni et al. ........................... 264/257 |
| 5,252,269 | 10/1993 | Hara et al. ............................ 264/45.3 |
| 5,460,761 | 10/1995 | Larsson ................................. 425/552 |
| 5,494,426 | 2/1996 | Ibar ....................................... 425/542 |
| 5,549,857 | 8/1996 | Kamiguchi et al. .................. 264/40.5 |
| 5,614,135 | 3/1997 | Maleczek .............................. 425/145 |
| 5,955,025 | 9/1999 | Muller ................................... 425/552 |
| 5,971,742 | 10/1999 | McCollum et al. ................... 264/316 |

FOREIGN PATENT DOCUMENTS

| | | |
|---|---|---|
| 491650 A2 | 6/1992 | European Pat. Off. . |
| 4-74620 | 3/1992 | Japan ..................................... 425/552 |
| 879769 | 10/1961 | United Kingdom . |
| WO 96/07532 | 3/1996 | WIPO . |

OTHER PUBLICATIONS

A. Delaney and H. Dochtermann, Plastic Molding Apparatus, IBM Techical Disclosure Bulletin, vol. 17, No. 2, pp. 479–480.

*Primary Examiner*—Jill L. Heitbrink
*Attorney, Agent, or Firm*—Merchant & Gould P.C.

[57] ABSTRACT

A method and apparatus for molding composite articles can include a pair of opposed hollow mold sections having first and second molding membranes which define a mold plenum therebetween. Each mold section can be filled with a substantially noncompressible, thermally conductive fluid. The temperature of the mold plenum can be controlled by regulating the temperature of the thermally conductive fluid. Sensing of various parameters during the injection and curing processes of the molding fluid, for example pressure, flowrate, temperature and filling of the plenum can be used to optimize the molding process.

26 Claims, 7 Drawing Sheets

METHOD AND APPARATUS FOR MOLDING COMPOSITE ARTICLES

RELATED APPLICATIONS

This application is a continuation-in-part of patent application Ser. No. 08/715,533 filed Sep. 18, 1996 now U.S. Pat. No. 5,971,742 and is also based upon provisional patent applications Serial Nos. 60/078,605, filed Mar. 19, 1998 and 60/079,441, filed Mar. 26, 1998.

BACKGROUND

The present invention relates to the manufacture of injection molded articles. Such articles can be molded from a polymer thermoset resin or can be composite articles, that is articles having a fiber reinforcement lattice within a cured resin matrix. More particularly, the invention relates to a method and apparatus for injection molding such polymer and composite articles.

Reaction injection molding and resin transfer molding are processes wherein dry fiber reinforcement plys (preforms) are loaded in a mold cavity whose surfaces define the ultimate configuration of the article to be fabricated, whereupon a flowable resin is injected, or vacuumed, under pressure into the mold cavity (mold plenum) thereby to produce the article, or to saturate/wet the fiber reinforcement preforms, where provided. After the resinated preforms are cured in the mold plenum, the finished article is removed from the mold.

The prior art teaches injection molding apparatus which consist of a pair of complementary or "matched" tools which provide these molding surfaces, which each tool being carefully machined, for example, from a rigid metal which is otherwise relatively nonreactive with respect to the resin to be used in conjunction therewith. Such matched metal molds are expensive to fabricate and are necessarily limited to the manufacture of a single article of a given design. Stated another way, even slight changes to the desired configuration of the article to be fabricated may necessitate the machining of an entirely new replacement tool.

Additionally, such known metal tools typically have substantial thermal mass which becomes increasingly problematic as the mold temperature deviates from the desired process temperatures. In response, such tools are often provided with an integral system of internal heating and/or cooling tubes or passages through which an externally supplied heating/cooling fluid may be circulated. However, in accordance with these prior art designs, the heating/cooling passages are positioned relative to the tool surfaces so as to leave a minimum spacing of perhaps 2 inches (5 cm) therebetween to ensure that the resulting article will be free of hot and cold lines or bands which might otherwise be generated in the article as a result of disparate heating/cooling rates during resin cure. This minimum spacing, in turn, inherently limits the ability of these prior art tools to accurately control temperature during the injection molding process, again, particularly where such processes are exothermic. And temperature control of the mold plenum becomes further problematic where variable-thickness articles are to be fabricated, given that the thicker portions of the article may well polymerize earlier, and will likely reach higher temperatures, than the thinner portions thereof.

Accordingly, such matched metal tools may have to be periodically idled for sufficient time to permit the mold to cool to an acceptable operating temperature, thereby substantially increasing the cost of article fabrication using such tools.

In an attempt to provide increased temperature control while facilitating removal of the finished article from the molding apparatus, the prior art teaches a modified molding apparatus wherein one of the mold surfaces is defined by a flexible member formed, for example, of rubber. The other mold surface is still defined by a rigid, thermally conductive metal tool which may be backed by a pressurized fluid such as steam whereby curing heat is transferred to the mold cavity for endothermic molding operations. Unfortunately, for such endothermic processes, heating but one side of the mold cavity may limit flexibility as to surface finish and other characteristics of the resulting article and, further, limit the degree to which resin cure may be accelerated. Moreover, where such molding apparatus are used in exothermic processes, the resulting heat accelerates deterioration of the flexible mold surface, thereby preventing long-term use of the tool. Moreover, such molding apparatus often requires evacuation of the mold plenum prior to injection of the resin therein, thereby rendering use and maintenance of such molding apparatus more complex, and processes employing such apparatus more time-intensive and costly.

Additionally, tools for closed molding applications are typically either machined or cast from expensive materials such as aluminum metals, composites, or metal alloys. There can be many problems with these kinds of tools, for example: high tooling costs, long lead times of 15 to 52 weeks, difficult or even impossible to modify and high repair or rebuild costs.

What is needed, then, is a matched-tool injection molding apparatus featuring replaceable mold surfaces which are easier and less costly to fabricate than known rigid or flexible tools while further offering increased temperature control during both endothermic and exothermic processes thereby to provide articles of improved quality at lower cycle times.

SUMMARY

Under the present invention, an injection molding apparatus includes a pair of mold sections, wherein each mold section itself includes a rigid housing and a semi-rigid membrane removably mounted to the housing so as to define a fluid-tight chamber therein. The membrane of each mold section, which, in turn, defines its molding surface, is preferably formed of an inexpensive composite material such as fiber reinforced plastics, or other suitable material; and, in accordance with the present invention, different membrane materials and/or characteristics may be selected for the respective membranes of each mold section. When the two mold sections are assembled with their respective molding surfaces in opposition to one another, a molding plenum is defined within which to fabricate the desired article. Thus, under the present invention, design changes to the article are readily accommodated through alteration or replacement of one or both of the low-cost membranes. Stated another way, under the present invention, a given mold section housing may be outfitted with any of a wide variety of relatively inexpensive composite membranes useful in the production of composite articles of different shapes, sizes and characteristics, thereby greatly reducing tooling costs as compared to the prior art. The dimensions of the mold section housings define a working envelope within which membranes of various different configurations can utilized. Any configuration designed to fit within the dimensions of the working envelope can be employed with no need to alter the mold section housing.

In accordance with the present invention, a noncompressible fluid is disposed within and fills the chamber of each mold section, whereby its respective membrane is supported so as to ensure proper dimensioning of the finished article while permitting slight dimensional flexing during resin injection, thereby to evenly distribute any injection-pressure loading of the membrane across its entire surface. The latter feature may prove especially advantageous where a spike in injection pressure is encountered during the resin injection step. As a further advantage, such slight dimensional flexing of the membrane during resin injection is believed to improve or enhance the flow of resin through the mold plenum. An expansion chamber in fluid communication with the chamber of one or both mold sections serves to accommodate thermal expansion of the membrane-backing fluid prior to injection of resin into the mold plenum, and subsequent to cure of the finished article, with a valve operating to isolate the chamber from the expansion chamber during resin injection and cure.

And, in accordance with another feature of the present invention, the backing fluid is itself preferably thermally conductive; and the molding apparatus further includes means in thermal communication with the backing fluid within one or both of the mold sections for regulating the temperature of the backing fluid. For example, in a preferred embodiment, the temperature regulating means includes a system of coils extending within each chamber, and an external heater/chiller unit of conventional design which is connected to the coil system and is operative to circulate a temperature control fluid at a predetermined temperature therethrough. In this manner, the temperature of the backing fluid and, correlatively, of the molding surface of each mold section may be closely regulated, thereby offering improved characteristics of the finished article and/or improved control of process parameters, such as cure time and temperature.

Other details, objects, and advantages of the invention will become apparent from the following detailed description and the accompanying drawings figures of certain presently preferred embodiments thereof.

BRIEF DESCRIPTION OF THE DRAWINGS

A more complete understanding of the invention can be obtained by considering the following detailed description in conjunction with the accompanying drawings, in which.

DETAILED DESCRIPTION OF CERTAIN EMBODIMENTS

Figure 1:
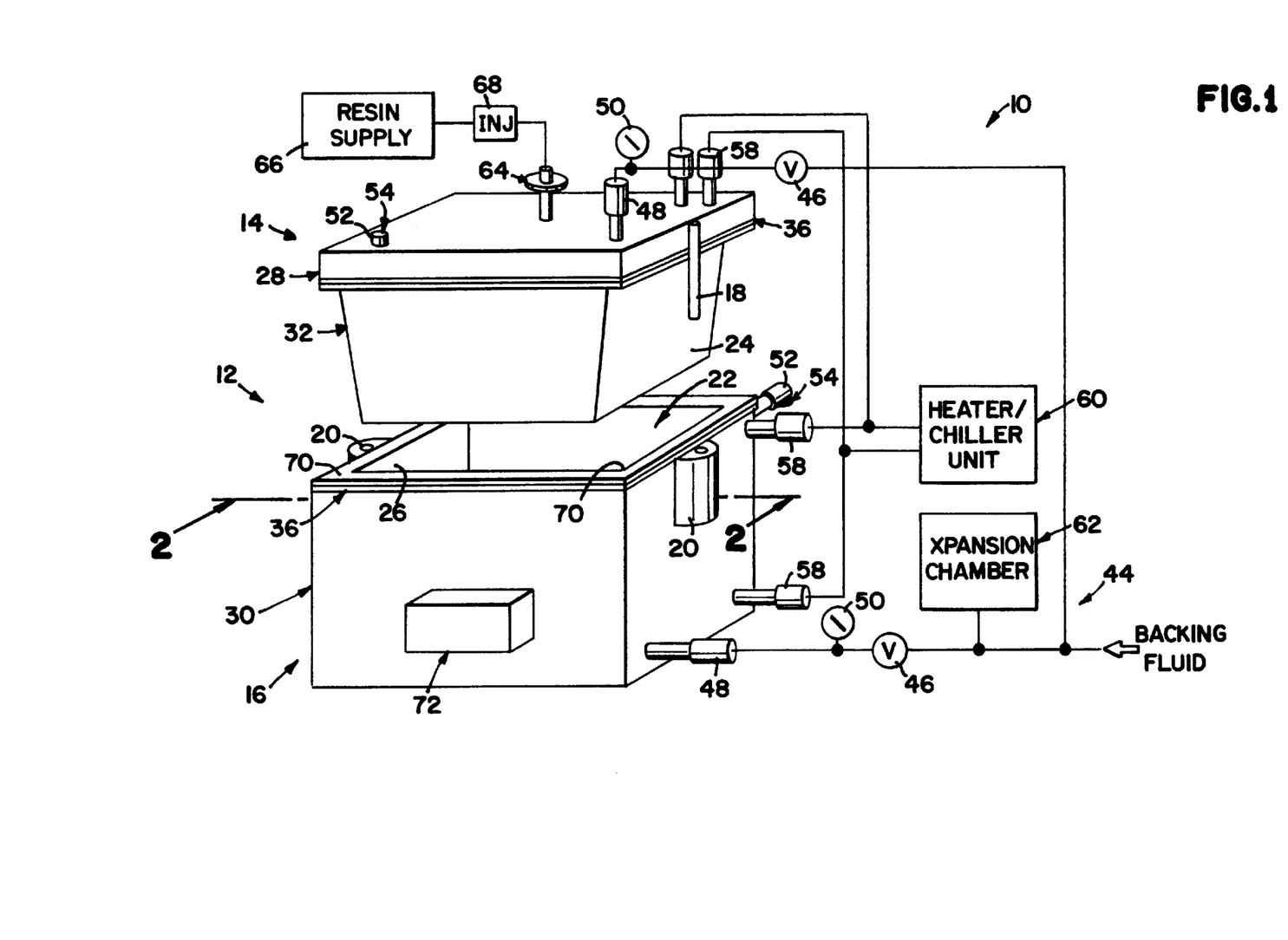
FIG. 1 is a partially diagrammatic, partially exploded isometric view of an injection molding apparatus in accordance with the present invention.

Referring to FIG. 1, an exemplary apparatus 10 under the present invention for molding a composite article includes a mold assembly 12 having an upper mold section 14 and a lower mold section 16 which define, upon assembly of the upper mold section 14 onto the lower mold section 16 with the aid of locating pins 18 and complementary pin receivers 20, a mold plenum 22 with the matched molding surfaces 24, 26 thereof. Specifically, the lower and upper mold sections 14, 16 each include a rigid housing 28, 30 and a semi-rigid membrane 32, 34 which is removably and sealably secured to the respective housing 28, 30 along the membrane's peripheral edge as by a flange 36. The flange 36 can have an inner periphery having a geometry which corresponds to the geometry of the semi-rigid membrane 32, 34 and an outer periphery having a geometry corresponding to the geometry of the housing 28, 30. Consequently, the flange 36 is reusable so that when a semi-rigid membrane 32, 34 is changed out the flange 36 can be detached from the old membrane and attached to the new one. Once assembled, the housings 28, 30 and membranes 32, 34 of each hollow mold section 14, 16 cooperate to define fluid-tight chambers 38, 40 therein.

In accordance with one feature of the present invention, each membrane 32, 34 is preferably relatively thin and formed of a composite overlay which, in its most elegant form, may simply comprise splash off of a blank of the article to be fabricated. And, while each membrane 32, 34 may conveniently be formed of fiber reinforced plastics, the present invention contemplates use of semi-rigid membranes 32, 34 fabricated from other suitable materials such as light sheet metal, which membranes 32, 34 may be conveniently and cheaply fabricated, shaped and reshaped in a pressure chamber in a manner known to those skilled in the art. In this regard, it is noted that the present invention contemplates use of either the same or different materials for the respective membranes 32, 34 of each mold section 14, 16 depending, for example, upon the desired characteristics of the membranes (e.g., its thermal conductivity, formability, and usable life), the desired characteristics of the fabricated article (e.g., surface finish and gloss), and/or overall process parameters (e.g., resin injection pressures, resin cure time and mold assembly cycle time).

Each hollow mold section 14, 16 is completely filled with a substantially noncompressible heat-conductive fluid 42 supplied by a fluid supply network 44. Once the hollow mold sections 14, 16 are full, the mold 10 is ready to be used to manufacture articles. The fluid 42 within each hollow mold section 14, 16 provides support for each membrane 32, 34 in compression during resin injection in a manner to be further described below. Since the fluid is substantially non-compressible, any force exerted on the membranes 32, 34, such as internal injection pressures, will be transferred through the fluid to the walls of the rigid housing 28, 30.

Figure 2:
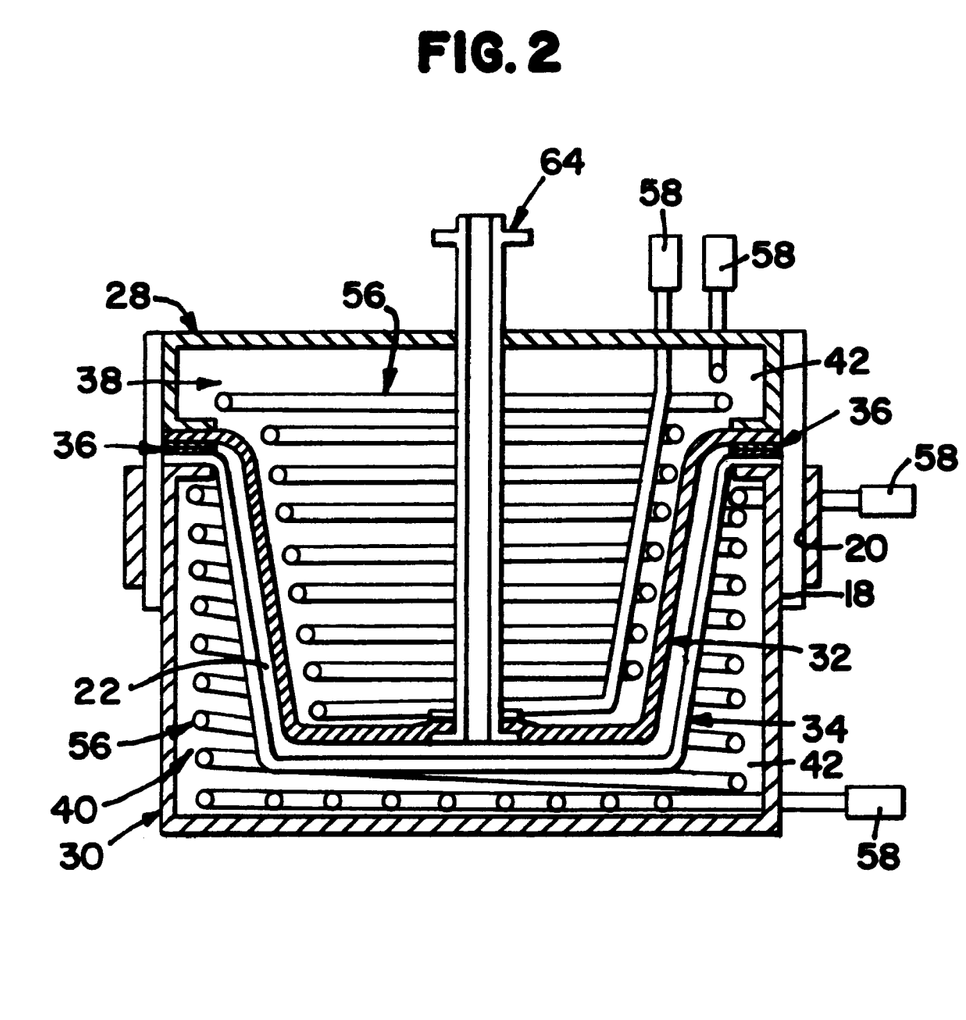
FIG. 2 is a cross-sectional view of the apparatus shown in FIG. 1 along vertical plane passing through line II—II thereof subsequent to assembly of the upper mold section onto the lower mold section thereof.

In the embodiment shown in FIG. 2, the membrane-backing fluid 42 can conveniently be tap water which is supplied by the network 44 to the upper and lower mold sections 14, 16 through respective inlet control valves 46 and quick connect couplings 48. Water is generally the preferred fluid since it is inexpensive, readily available and environmentally friendly. However, other suitable backing fluids useful over different operating ranges (e.g., having higher vaporization temperatures) will be known to those skilled in the art. A pressure gauge 50 may be employed downstream of each inlet valve 46 to monitor the flow rate of backing fluid 42 into the chamber 38, 40 of each mold section 14, 16. To facilitate the filling and emptying of each chamber 38, 40, each mold section 14, 16 can have a vent 52 through which air within each chamber 38, 40 may escape upon the filling thereof with backing fluid 42. Once filled, each chamber's vent 52 is sealed with a vent valve 54, thereby imparting requisite rigidity to each mold section's membrane/molding surface 24, 26.

As seen in FIG. 2, wherein the relative dimensions of, for example, the membranes 32, 34 and mold plenum 22 are exaggerated for ease of illustration, each mold section 14, 16 can be provided with a system of heating/cooling coils 56 extending within the fluid-tight chambers 38, 40 for regulating the temperature of the mold plenum 22. The optional heating/cooling coils 56 can be coupled via quick connect couplings 58 to an external heater 60 and chiller 61 units of conventional design. As such, the coils 56 operate in conjunction with the heater 60 and chiller 61 units to precisely regulate the temperature of the backing fluid 42 and, hence, the molding surface 24, 26 of each membrane 32, 34 throughout the injection molding process. Although the coils are illustrated in FIG. 2 as being located proximate to the back side of the membrane 32, 34, the thermal conductivity of the backing fluid 42 enables substantial design variation with respect to placement of the coils 56 within each mold section 14, 16. Thus, even where such coils 56 are used, the thermal conductivity of the backing fluid 42 enables substantial design variation with respect to the placement of the coils within the mold sections 14, 16 which, in turn, facilitates the use of a given mold section 14, 16 and coil system 56 with a wide variety of membranes 32, 34. Indeed, under the present invention, while the membranes 32, 34 of the exemplary apparatus 10 are shown in FIG. 2 as being of relatively uniform thickness, the efficiency with which mold temperature may be controlled under the present invention permits the use of variable-thickness membranes 32, 34, as may be desirable, for example, when providing the finished article with reinforcement ribs.

To the extent that the backing fluid 42 with which each mold section 14, 16 is filled is supplied at a temperature different from the desired process temperature, the fluid supply network 44 can further include an expansion chamber 62, which may be a low pressure expansion chamber. Thus, upon subsequent heating or cooling of each mold section 14, 16 to the desired temperature, any resulting thermal expansion of the backing fluid 42 within each chamber 38, 40 can be accommodated by the expansion chamber 62, thereby preventing distortion and/or deleterious stress on the membranes 32, 34.

Returning to the drawings, an injection sprue 64 may be seen in FIG. 2 as extending through the upper mold section 14 to provide a pathway through which a desired thermoset resin from a molding fluid supply 66 may be injected under pressure by a suitable injection pump 68 into the mold plenum 22. The number and placement of such sprues 64 depends upon the configuration and desired characteristics of the article to be molded, and the flow characteristics of the molding fluid employed, in a manner known to those skilled in the art. In this regard, it will be seen that a series of small vents 70 can be provide between the opposed flanges 36 of the upper and lower mold sections 14, 16 through which trapped air may bleed to the atmosphere during injection of the molding fluid into the mold plenum 22. Alternatively, other, conventional methods of providing for the escape of trapped air from the mold plenum 22 may be employed.

In accordance with another feature of the present invention, the molding apparatus 10 can further include a mechanism indicated generally by reference numeral 72 on the lower mold section 16 for vibrating the mold assembly 12 or, the backing fluid 42 contained in the lower mold section 16. Vibration of the mold assembly 12 or backing fluid 42 during injection of the resin may facilitate resin flow through the mold plenum 22, and may also improve saturation and wetting of any fiber reinforcement preforms situated therein.

In accordance with the present invention, the molding apparatus 10 shown in the drawings may be used as follows: one or more fiber reinforcement preforms can be laid within the mold cavity defined by the "female" molding surface 26 of the lower mold section 16. The upper mold section 14 is thereafter lowered onto the lower mold section 16 so as to engage locational alignment hardware on each mold section 14, 16, such as locating pins 18 and respective pin receivers 20. Where desired, the upper mold section 14 can then be secured to the lower mold section 16 as through the use of suitable clamps (not shown). Each mold section 14, 16 is then connected to the backing fluid supply network 44, and its respective vent 52 is opened and inlet valve 46 is operated, thereby to completely fill the chamber 38, 40 therein with backing fluid before injection molding of the articles begins. In this regard, it is to be understood that the mold sections 14, 16 need to be filled with the backing 42 fluid only once prior to beginning the injection process. It is not necessary to drain each mold section 14, 16 after molding articles and then refill them again before molding additional articles.

Once the chambers 38, 40 are completely filled, each mold section is sealed with its respective vent valve 54 and the heater 60 and chiller 61 units are operated to bring each mold section 14, 16 to the desired process temperature. The inlet valve 46 to each mold section 14, 16 is thereafter closed to isolate its respective chamber 38, 40 from the fluid supply network's expansion chamber 62 (which otherwise has accommodated any thermal expansion of the backing fluid 42 during temperature normalization).

The desired molding fluid is thereafter injected under pressure into the mold plenum 22 through the injection sprue 64. The optimal flow rate at which the molding fluid is injected is based upon a number of factors well known to those skilled in the art.

Once the mold plenum 22 is completely filled with molding fluid the injection ceases. Whether the mold plenum 22 is completely filled can be visually confirmed by discharge of the molding fluid through the use of air bleeds formed in the flanges 36 of each mold section 14, 16, or can be automatically confirmed with sensors. The use of feedback from different types of sensors to optimize the molding process is treated below in more detail in connection with the description of FIG. 3.

The temperature of each molding surface 24, 26 can be regulated via operation of the heater 60 and chiller 61 units to thereby provide an optimum cure rate with which to obtain the desired surface finish and/or other desired characteristics of the finished article, or to otherwise optimize the molding process. The mold sections 14, 16 are thereafter separated, and the finished article can be removed from the mold cavity manually or using automatic injectors.

In accordance with another feature of the present invention, due to the semi-rigid character of the membranes 32, 34, the membranes can dimensionally flex slightly during the injection of molding fluid as the backing fluid 42 distributes the resulting injection pressure load across the entire surface of the membranes 32, 34. In this manner, the semi-rigid membranes 32, 34 avoid deleterious stress concentrations on the molding surfaces 24, 26 during injection. Indeed, the slight flexing of the molding surfaces 24, 26 of one or both membranes 32, 34 during injection is believed to further improve or enhance the flow of molding fluid through the mold plenum 22, which effect may be further enhanced by deliberately pulsing the injected molding fluid, all without deleterious impact on the molding tools (the membranes 32, 34).

Figure 3:
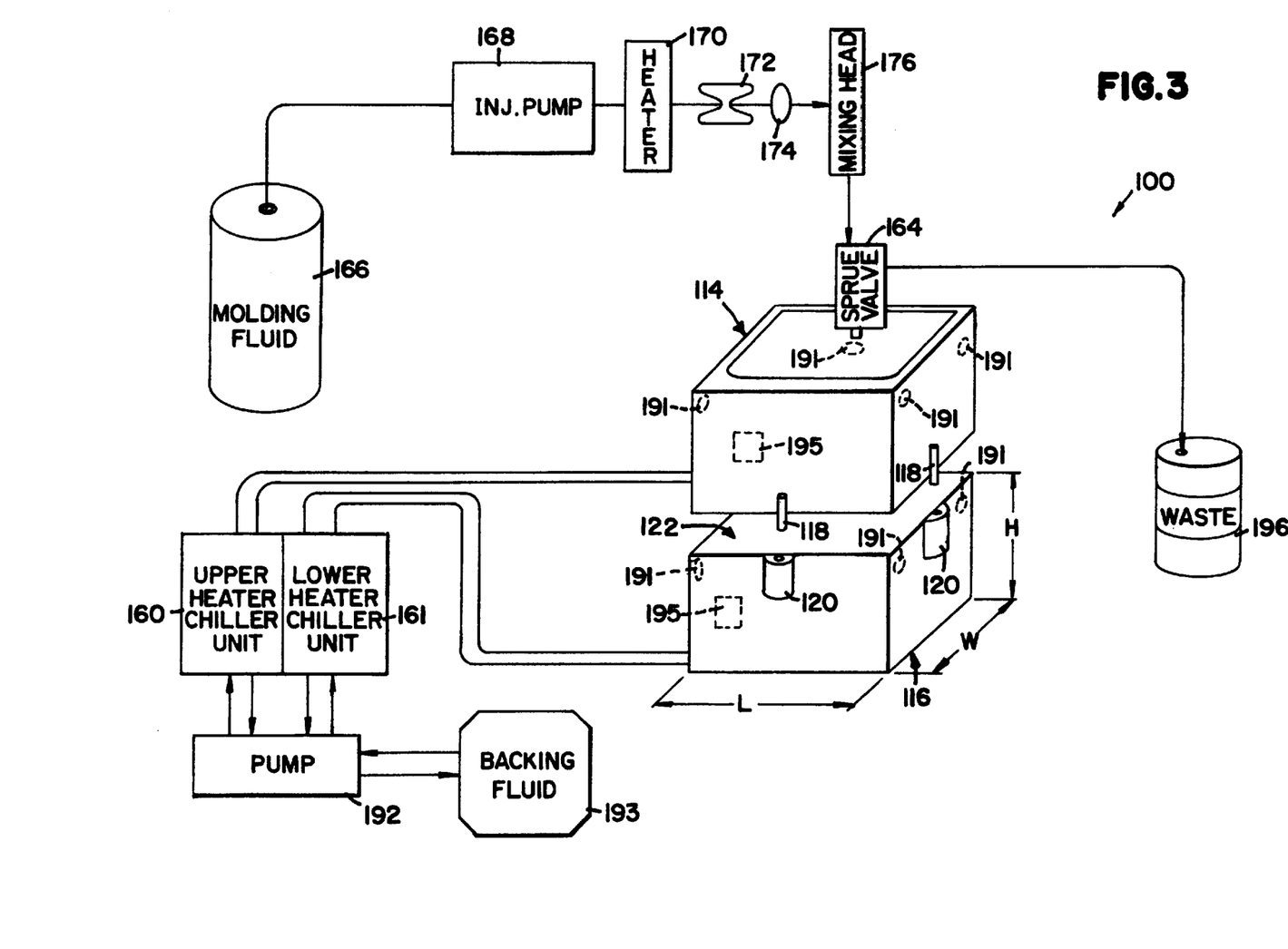
FIG. 3 is a partially diagrammatic, partially exploded isometric view of another embodiment of an injection molding apparatus similar to FIG. 1, but further including certain devices for providing feedback to optimize the molding process.

To optimize the molding process, various devices can be employed to provide feedback which can be utilized to adjust different parameters of the molding process, such as injection rate, to improve the quality of the molded article. A second exemplary molding apparatus 110 is shown in FIG. 3, having a mold assembly 112 with mold sections 114, 116 similar to the molding apparatus 10 shown in FIG. 1. As shown, molding fluid can be delivered from a molding fluid storage container 166 by an injection pump 168. The system can also preferably include a resin heater 170, flowmeter 172, pressure sensor 174 and mixing head 176 between the pump 168 and the injection sprue 164.

The molding apparatus 110 can also include certain preferred devices for providing feedback to optimize the molding process. Both internal and external devices can be employed to provide feedback for use in monitoring and optimizing the molding process while injection is ongoing. Sensors internal to the mold can include, for example, temperature sensors 191 which can be provided at multiple locations in each mold section 114, 116 to monitor the temperature in the mold plenum 122. The temperature sensors can be devices well known to those of skill in the art, such as RTDs and thermocouples. Other internal feedback systems can include pressure transducers 195 within the mold sections 114, 116 and passive sensors 198 within the mold plenum 122 itself for detecting the progress of the molding fluid as it fills the mold plenum 122. These passive sensors 198 are shown, in FIG. 5, as positioned, for example, on the male mold membrane 200. However, the passive sensors 198 could also be located on the female mold membrane 203 or on both membranes.

The pressure transducers 195, which devices employed are also types well known to those of ordinary skill in the art, sense the pressure in the fluid filled mold sections 114, 116 while molding fluid is being injected into the mold plenum 122 and provide feedback indicative of the pressure in the mold plenum 122. As the plenum 122 is filling with molding fluid, pressure sensed in the mold section 114, 116 will typically gradually increase. However, as the mold plenum 122 becomes substantially filled, the pressure sensed will generally increase relatively sharply. The relatively sharp increase in pressure indicates that the plenum 122 is substantially full and the injection process can be regulated accordingly. Additionally, pressure sensors could be provided to sense pressure associated with mold plenum itself by, for example, providing sensors on the one or both of the mold membranes 200, 203.

The passive sensors 198 for detecting the leading edge of the molding fluid as it fills the mold plenum 122 can be passive proximity switches. These switches are designed to detect the leading edge of the flow without impeding that flow through the mold plenum 122. Such passive proximity switches can be of the types well known to those skilled in the art, a preferred type being, for example, a capacitive proximity switch.

Additionally, external devices can also be provided for sensing various other parameters during the injection process. For example, linear velocity/displacement transducers (LVDTs) can be provided to detect when all or a part of the mold plenum has filled. The LVDTs detect displacement between the two mold sections 114, 116 when molding fluid is being injected into the mold plenum 122. The amount of displacement is indicative of whether, and how much, the mold plenum has filled. Such LVDTs as utilized herein are well known to those of ordinary skill in the art.

The flow meter 172 can be employed to monitor the flow rate of the molding fluid as is being injected. Moreover, the pressure gauge 174 can be provided to measure the pressure at which the molding fluid is being injected. If the injection pressure falls outside of a desired range of pressure, the injection rate can be adjusted accordingly. Another device for optimizing the molding process is the molding fluid heating unit 170 which can be used to heat the molding fluid. Heating the molding fluid can alter its viscosity and thus change the flow rate. As shown in FIG. 3, the heating unit 170 can preferably be positioned in the system between the injection pump 168 and the flowmeter 172 so that the change in flow rate caused by the heater 170 can be monitored.

In addition to the sensor devices, a backing fluid pump can be provided to increase the pressure in either of the mold sections 114, 116 by pumping fluid into the mold sections after injection is complete. This increases the pressure in the mold section which effectively increases the pressure in the mold plenum 122. This might be desirable, for example, after the mold is filled in order to speed up the curing process of the resin to increase the cycle time.

Feedback from all of the aforementioned internal and external devices can be advantageously utilized to optimize the molding process even as the molding fluid is being injected. Together, of the sensors form a response system which is designed to close the loop between CNC injection machinery and the floating mold. This response system permits injection profiles to be adjusted dynamically based on actual mold conditions and parameters in order to optimize the injection process even as the mold plenum 122 is being filled with molding fluid. This ability to dynamically control and optimize the molding process also contributes to reduced cycle time and improved cosmetics of the molded part as well as reduced wear on tooling.

The hollow fluid filled mold sections 14, 16, 114, 116 provide excellent thermal conductivity which permits superior mold temperature control. In contrast, thermoset molding in open-face tooling forces the rheology to be formulated to work at ambient temperatures. Consequently, such molding processes are subject to variables in the ambient temperature. For example, experienced composite fabricators will have different chemistry formulations based on the weather conditions to optimize the cure of the thermoset, i.e., summer and winter resins or morning and afternoon catalyst levels. This ad hoc adjusting can be about as predictable as forecasting the weather. In contrast, a floating mold according to the invention provides a stable and controllable mold surface temperature which permits molding to be performed without needing to compensate for ambient conditions. The controlled temperature ranges permit the rheology to be much faster in cycle times and provides the added bonus of the chemical reaction's optimal control limits being unaffected by the ambient temperature ranges that can otherwise effect production rates. Thus, such a closed-mold system creates new controls and predictability in the production of molded parts.

Figure 4:
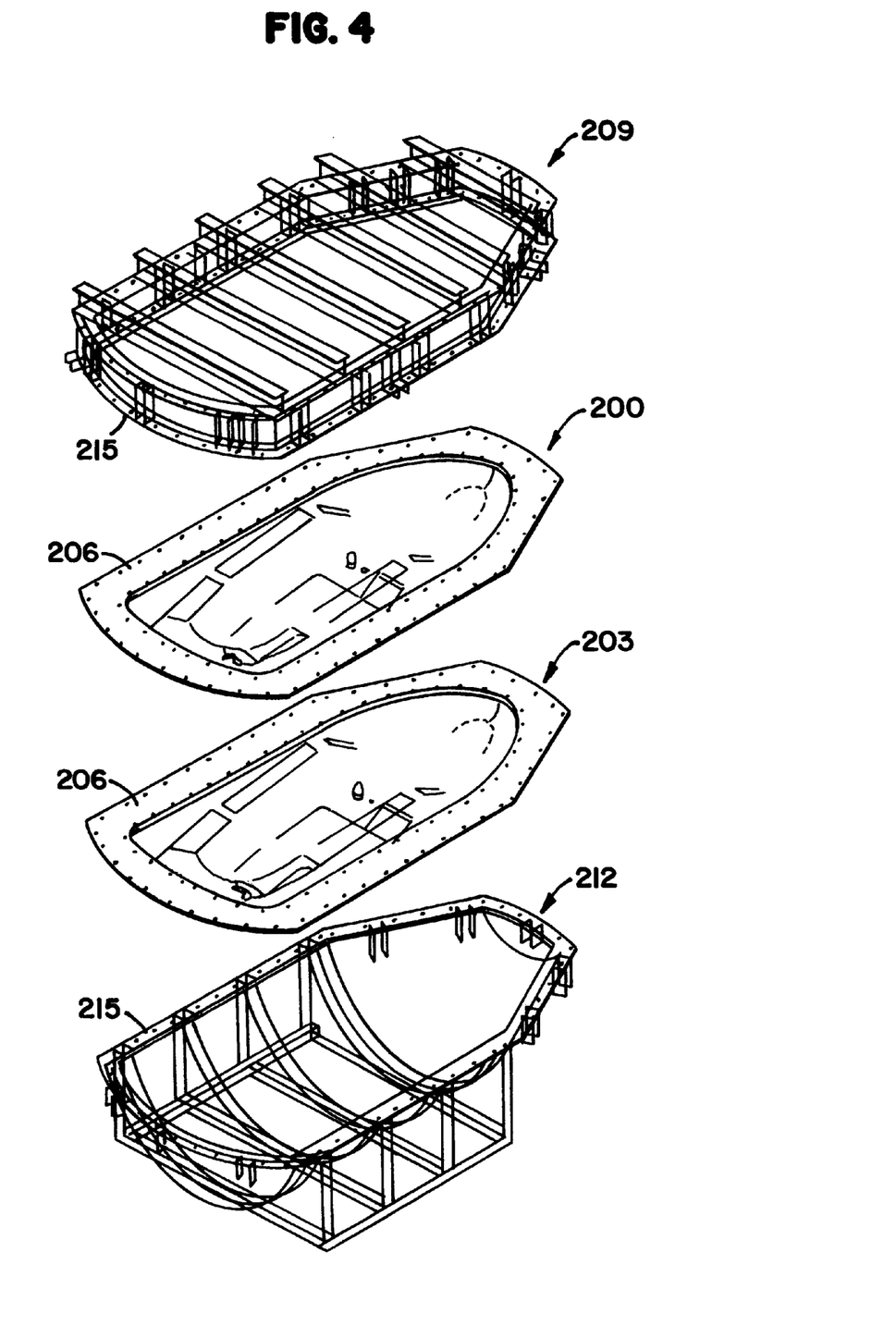
FIG. 4 is an exploded perspective view of an embodiment of the apparatus in FIG. 1 showing for molding boat hulls.
Figure 5:
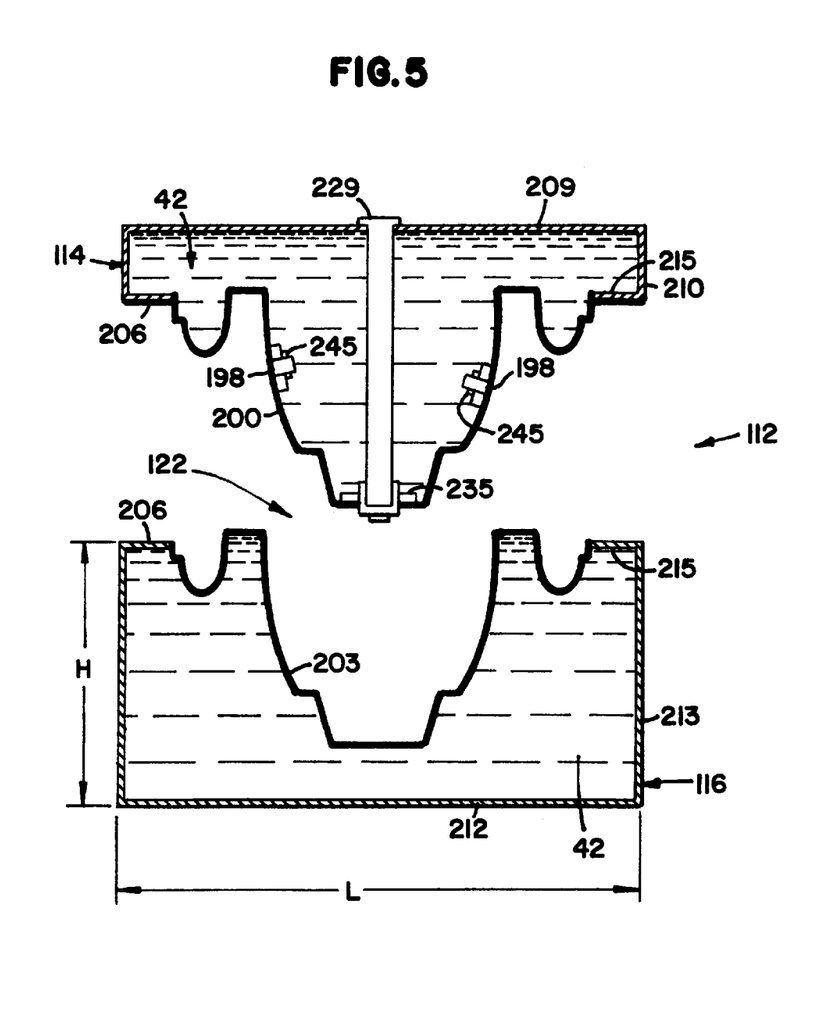
FIG. 5 is a cross sectional view, similar to FIG. 2, of the fully assembled molding apparatus shown in FIG. 4.
Figure 6:
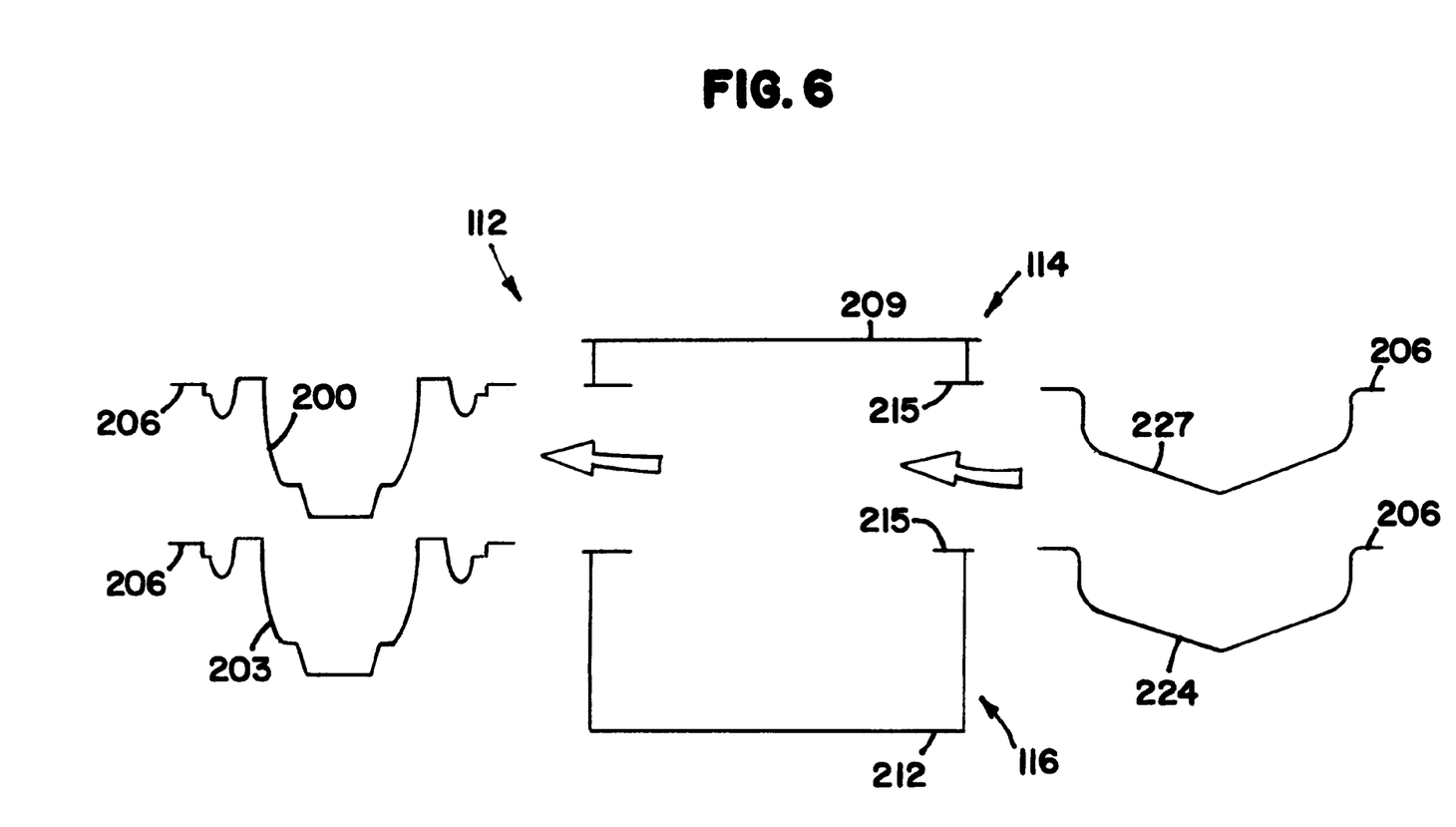
FIG. 6 is a simplified schematic of the apparatus shown in FIG. 4 illustrating the interchangeability of membranes.

In construction of a molding apparatus according to the invention, and as described above in connection with FIGS. 1–3, a master model can be used to create a pair molding surfaces. As shown in FIGS. 4 through 6, one male mold membrane 200 and one female mold membrane 203 are produced to create the proper cavity size therebetween. Preferably, the sprue 164, sensors and any other hardware which must communicate through the mold membranes 200, 203 into the plenum 122 can be releasably connected using modular bulkhead fittings, such as the sprue bulkhead fitting 235 and passive proximity switch bulkheads 245, shown in FIG. 5. These bulkhead fittings can be attached to the membranes 200, 203 as, for example, shown in FIG. 7 with respect to the sprue 164 bulkhead fitting. Other types of bulkhead fittings, such as the passive proximity switch fittings can be attached in a similar fashion, or in other ways well known to the skilled artisan. In any configuration, the modular fittings 235, 245 can be adapted to releasably connect the requisite molding hardware and sensors to the mold membranes 200, 203. In this manner, all of the necessary closed molding hardware and sensors can be quickly connected or removed from the mold skins 200, 203. The molding hardware and sensors can include, for example, sprues, automatic ejectors, and various sensors such as thermocouples and proximity switches. Consequently, it is not necessary to laminate each individual piece of hardware and sensor directly into the mold membrane. Instead, all hardware is releasably connected to the modular fittings 235, 245. for convenience and efficiency of changing out the molds. When the membranes 200, 203 are changed out, the quick connected hardware is simply disconnected form the changed out membranes 200, 203 and reconnected to modular fittings 235, 245 provided on the replacement mold membranes 224, 227. However, these components, and the attachment flanges, could be alternatively laminated molded directly into the mold membrane 200, 203 itself.

To construct the two mold halves, a pair of universal vessels 209, 212 can be created, one for the male membrane 200 and one for the female membrane 203. The framework of each universal vessel 209, 212, is provided with an outer skin 210, 213 which can be made from, for example, sheet metal, to form a rigid enclosed mold section 114, 116. Flanges 215 are provided which have an inner periphery corresponding to the geometry of the mold membrane 200, 203 and outer periphery corresponding to the geometry of the universal vessel 209, 212. The flanges 215 can be attached to each of the mold membranes 200, 203. Each mold membrane 200, 203 is attached to its own corresponding universal vessel 209, 212 via the flanges 215 to create a liquid-tight seal between each universal vessels and its corresponding mold membrane. Once the mold membranes 200, 203 are sealed to the mold sections 114, 116, each mold section is filled with backing fluid 42, as shown in FIG. 4. A single mold 112 comprised of two mold sections 114, 116 with attached mold membranes 200, 203 can be utilized to produce a variety of different parts simply by changing out the male 200 and female 203 mold membranes attached to each universal vessel 209, 212.

As can be seen in FIG. 3, each rigid housing 28, 30 of the hollow mold sections 14, 16 forms a chamber having a fixed volume defined by the length, width and height of the housing 28, 30, shown as L, W and H, respectively, in FIG. 6. This volume and particularly the volume of the female mold section 14 defines a working envelope within which the semi-rigid membrane 32, 34 must fit. Although the semi-rigid membranes 32, 34 are illustrated in FIG. 2 as having a simple "hub" shape, the semi-rigid membranes 32, 34 can actually be formed in any of variety of different configurations, for example, as shown in FIGS. 4–6 which are limited only by the size of the working envelope defined by the fixed dimensions of, primarily, the female mold section 32. As will be described in more detail in connection with FIG. 6, the same rigid housings 28, 30 can be used to mold differently configured parts simply by interchanging differently configured semi-rigid membranes 32, 34.

When the mold sections 114, 116 have been filled with the backing fluid 42 and all air is purged from the interior of each mold section, the apparatus is ready to mold articles. The two assembled mold sections 114, 116 can be placed in a lifting frame (not shown) which is employed to allow the mold to be opened and closed to make parts. Due to the non-compressibility of the backing fluid 42, the floating mold is a rigid hydraulic system. Any forces exerted on the mold membranes 200, 203, such as internal injection pressures, will be transferred through the backing fluid 42 to the universal vessel 209, 212. The universal vessels are designed to handle the maximum potential pressure generated from the injection process. Generally, such a mold can be used in any low pressure injection process.

Although not shown in FIG. 4, each mold section 114, 116 can also be provided with the heating coils 56 described in connection with FIG. 2. The optional heating coils 56 can likewise be connected to the heater 160 and chiller 161 units for controlling the temperature of the backing fluid 42.

To produce parts, the filled mold sections 114, 116 are closed and the injection process is started. Because each mold sections 114, 116 is fluid filled the mold has excellent thermal conductivity which allows for much improved temperature control of the mold surfaces which results in reduced cycle time and improved cosmetics. As shown in FIG. 6, molding differently configured parts is as simple as removing one set of mold membranes 200, 203 and replacing them with a differently configured set. Some benefits of the floating mold are flexibility, reduced cost, speed to market and increased closed molding performance. For example, when a part design is changed, rather than creating new molds and obsoleting current molds, or performing expensive mold modifications, the molded membranes are simply changed out. The mold membranes may be composite laminates which can be reproduced a price comparable to open-faced, spray-up or hand-laminated molds. The universal vessels 209, 212 of the floating mold define what may be termed a "working envelope." What this means is that any part that will fit into the L, W, H dimensions of the universal vessel 209, 212 and primarily the final universal vessel 212, can be molded by simply creating new male 200 and female 203 mold membranes and attaching them to the universal vessel 200, 212. Consequently, tooling costs of the universal vessels are optimized.

As shown in FIGS. 4–6, a good example of an application for the floating mold is the molding of boat decks and hulls. The molder can easily change out the membranes 200, 203 of the mold sections 114, 116 to create different parts whenever needed. The floating molds are designed to allow the entire mold to be changed out in less than ten minutes.

Besides of the use of the closed-loop temperature regulating system, the containment of the non-compressible fluid remains an advantageous feature of the present invention. Since the fluid is confined within each mold section 14, 16 (or 114, 116) and because the fluid is noncompressible, it serves to strengthen the membranes 32, 34 (or 200, 203, 224, 227). By using the fluid, the molding membranes can be formed in a very thin layer. Consequently, heat transfer control of the molded part is enhanced and the mold membranes can be formed more easily and less expensively. Preferably, each mold membrane can be formed from a highly thermally-conductive material. The relatively large volume of fluid, such as water, also provides a relatively stable temperature environment, since it resists rapid fluctuations in temperature which can adversely affect the molded part.

Figure 7:
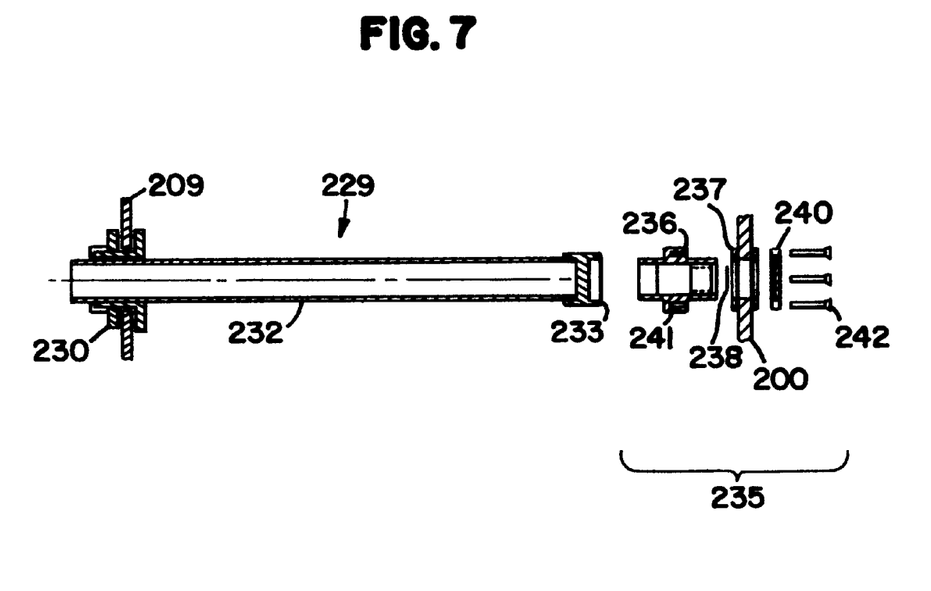
FIG. 7 shows a presently preferred embodiment of a sprue modular bulkhead fitting.

Referring now to FIG. 7, an embodiment of a modular bulkhead assembly 229 for releasably attaching the sprue 164 to the mold membrane 200 is shown having three basic parts: a mold housing bulkhead fitting 230 which attaches through the mold housing 209; an extension member 232, which can have the appropriate length to span the distance from the outer mold housing 209 to the mold membrane 200; and a mold membrane bulkhead fitting 235 which attaches through the mold membrane 200. The mold membrane bulkhead fitting 235 includes a bulkhead body 236 having one end which projects through the mold membrane 200. A bulkhead nut 240 attaches to the bulkhead body 236 on the inside of the mold membrane 200 opposite the bulkhead body 236. Receptacles 241 can be provided on the bulkhead body 236 for receiving fasteners 242 which secure the bulkhead nut 240 to the bulkhead body 236. Gaskets 237 and O-rings 238 can be employed as shown for a proper seal. The extension member 232 can have a receiver portion 233 on the end thereof which is configured to attach to the bulkhead body 236. Once assembled, the mold membrane bulkhead fitting 235 can be easily disconnected from the mold membrane 200 if it is desired to change membranes. It is to be understood that other variations for releasably connecting hardware and sensors to the mold membranes can be fashioned by artisans of ordinary skill.

Moreover, while certain preferred embodiments of the invention have been disclosed and described herein, it should be appreciated that the invention is susceptible of modification without departing from the spirit of the invention or the scope of the following claims.

What is claimed is:

1. A method of molding an article comprising:
   (a) arranging first and second rigid hollow mold sections in a spaced apart opposed relationship;
   (b) defining a mold plenum between a first semi-rigid membrane attached to a side of said first hollow mold section and a second semi-rigid membrane attached to a side of said second hollow mold section adjacent said first semi-rigid membrane such that said first and second semi-rigid membranes are disposed opposite each other forming therebetween said mold plenum whenever said first and second hollow mold sections are closed together to mold articles;
   (c) filling said first and second rigid hollow mold sections with a substantially noncompressible backing fluid such that molding pressure produced in said mold plenum is transmitted from said first and second semi-rigid membranes to said first and second rigid hollow mold sections;
   (d) accommodating thermal expansion of said backing fluid by an expansion chamber in fluid communication with said first and second rigid hollow mold sections;
   (e) injecting molding fluid into said mold plenum to produce a molded part;
   (f) monitoring a flow rate at which said injecting molding fluid is carried out;
   (g) sensing at least one parameter indicative of said mold plenum filling with said molding fluid; and
   (h) controlling said flow rate responsive to said at least one parameter.

2. The method of claim 1 wherein said sensing at least one parameter further comprises sensing prevailing pressure at which said molding fluid is injected.

3. The method of claim 1 wherein said sensing at least one parameter further comprises sensing prevailing pressure in at least one of said first and second fluid filled mold sections.

4. The method of claim 1 wherein said sensing at least one parameter further comprises sensing said molding fluid has entered at least certain portions of said mold plenum.

5. The method of claim 4 wherein said sensing said molding fluid has entered at least certain portions of said mold plenum further comprises detecting linear displacement between said first and second fluid filled mold sections.

6. The method of claim 5 wherein said detecting linear displacement comprises utilizing a LVDT to detect said linear displacement.

7. The method of claim 4 wherein said sensing said molding fluid has entered at least certain portions of said mold plenum further comprises detecting a leading edge of a flow of molding fluid advancing through said at least certain portions of said mold plenum during said injecting.

8. The method of claim 7 wherein said detecting said leading edge comprises utilizing a passive proximity switch to detect said leading edge.

9. The method of claim 1 further comprising heating said molding fluid prior to said injecting.

10. A method of molding an article according to claim 1 further comprising isolating the rigid hollow mold sections from the expansion chamber during injection of the molding fluid into the mold plenum.

11. A method of molding a composite article comprising:
   (a) arranging first and second rigid hollow mold sections in a spaced apart opposed relationship;
   (b) defining a mold plenum between a first semi-rigid membrane attached to a side of the first rigid hollow mold section and a second semi-rigid membrane attached to a side of said second rigid hollow mold section adjacent said first semi-rigid membrane such that said first and second semi-rigid membranes are disposed opposite each other forming therebetween said mold plenum whenever said first and second rigid hollow mold sections are closed together to mold articles;
   (c) filling said first and second rigid hollow mold sections with a substantially noncompressible backing fluid such that molding pressure produced in said mold plenum are transmitted from said first and second semi-rigid membranes to said first and second rigid mold sections;
   (d) accommodating thermal expansion of said backing fluid by an expansion chamber in fluid communication with said first and second rigid mold sections;
   (e) inserting reinforcement materials between said first and second semi-rigid membranes prior to closing said first and second mold sections together to mold articles;
   (f) closing said first and second mold sections towards each other such that said reinforcement materials are sandwiched in said mold plenum;
   (g) rigidly retaining said first and second mold sections together with said reinforcement materials sandwiched in said mold plenum;
   (h) injecting molding fluid under pressure into said mold plenum to produce a composite molded article;
   (i) monitoring a flow rate at which said injecting molding fluid is carried out;
   (j) sensing at least one parameter indicative of said mold plenum filling with said molding fluid; and
   (k) controlling said flow rate responsive to said at least one parameter.

12. The method of claim 11 further comprising heating said molding fluid prior to said injecting.

13. The method of molding a composite article according to claim 11 comprising the step pulsing the molding fluid during injecting of said molding fluid to said mold plenum.

14. A method of molding an article comprising:
(a) arranging first and second rigid hollow mold sections in a spaced apart opposed relationship;
(b) defining a mold plenum between a first semi-rigid membrane attached to a side of said first hollow mold section and a second semi-rigid membrane attached to a side of said second hollow mold section adjacent said first semi-rigid membrane such that said first and second semi-rigid membranes are disposed opposite each other forming therebetween said mold plenum whenever said first and second hollow mold sections are closed together to mold articles;
(c) filling said first and second rigid hollow mold sections with a substantially noncompressible backing fluid such that molding pressure produced in said mold plenum is transmitted from said first and second semi-rigid membranes to said first and second rigid hollow mold sections;
(d) sensing the temperature of said backing fluid;
(e) controlling the temperature of said backing fluid to regulate the temperature of said mold plenum by a system of coils disposed within said first and second rigid hollow mold sections;
(f) injecting molding fluid into said mold plenum to produce a molded part;
(g) monitoring a flow rate at which said injecting molding fluid is carried out;
(h) sensing at least one parameter indicative of said mold plenum filling with said molding fluid; and
(i) controlling said flow rate responsive to said at least one parameter.

15. A method of molding an article comprising:
(a) arranging first and second rigid hollow mold sections in a spaced apart opposed relationship;
(b) removably mounting a first semi-rigid membrane attached to a side of the first rigid hollow mold section and a second semi-rigid membrane attached to a side of the second rigid hollow mold section to define a fluid-tight chamber in each mold section;
(c) disposing the semi-rigid membranes such that the first and second semi-rigid membranes are disposed opposite each other forming therebetween a mold plenum whenever the first and second rigid hollow mold sections are closed together to mold articles;
(d) filling the fluid tight chamber in the first and second rigid hollow mold sections with a substantially non-compressible backing fluid such that molding pressure produced in the mold plenum is transmitted from the first and second semi-rigid membranes to the first and second rigid hollow mold sections;
(e) accommodating thermal expansion of the backing fluid by an expansion chamber in fluid communication with the hollow mold sections;
(f) injecting molding fluid into the mold plenum to produce a molded part;
(g) monitoring a flow rate at which the injecting of molding fluid is carried out;
(h) sensing at least one parameter indicative of the mold plenum filling with the molding fluid; and
(i) controlling the flow rate responsive to the at least one parameter.

16. The method of molding an article according to claim 15 comprising the step of pulsing the molding fluid during injecting of molding fluid to the mold plenum.

17. The method of molding an article according to claim 15 comprising the step of vibrating the mold assembly during injecting of the molding fluid to the mold plenum.

18. An injection molding apparatus comprising:
a. a first rigid hollow mold section having a first semi-rigid membrane connected thereto;
b. a second rigid hollow mold section having a second semi-rigid membrane connected thereto, said second mold section disposed adjacent said first mold section such that said first and second semi-rigid membranes oppose each other;
c. said first and second semi-rigid membranes defining a mold plenum therebetween;
d. a substantially non-compressible backing fluid filling each of said first and second hollow mold sections;
e. an injection sprue in fluid communication with said mold plenum for delivering molding fluid therein;
f. at least one flow meter fluidly interposed between a source of said molding fluid and said mold plenum; and
g. at least one sensor operatively associated with at least one of said first mold section, second mold section and said mold plenum, said sensor detecting at least one parameter indicative said mold plenum filling with said molding fluid.

19. The apparatus of claim 18 further comprising at least one pressure sensor fluidly interposed between a source of said molding fluid and said injection sprue for detecting injection pressure.

20. The apparatus of claim 18 further comprising a heating unit fluidly interposed between a source of said molding fluid and said injection sprue.

21. The apparatus of claim 18 further comprising said at least one sensor being associated with at least one of said first and second mold sections for detecting pressure therein.

22. The apparatus of claim 18 further comprising further comprising said at least one sensor being associated with said mold plenum for detecting pressure therein.

23. The apparatus of claim 18 further comprising said at least on sensor being associated with at least one of said first and second mold sections, said at least one sensor detecting displacement between said first and second mold sections.

24. The apparatus of claim 23 wherein said at least on sensor comprises an LVDT.

25. The apparatus of claim 18 further comprising said at least one sensor being associated with said mold plenum, said at least on sensor detecting a leading edge of a flow of molding fluid without interfering with said flow as it advances through said mold plenum.

26. The apparatus of claim 25 wherein said sensor comprises a capacitive proximity switch.

* * * * *